US006703094B2

(12) United States Patent
Kakii et al.

(10) Patent No.: US 6,703,094 B2
(45) Date of Patent: Mar. 9, 2004

(54) CHARGING MEMBER, PROCESS CARTRIDGE AND ELECTROPHOTOGRAPHIC APPARATUS

(75) Inventors: Hitoshi Kakii, Shizuoka (JP); Toshimitsu Nakazawa, Ibaraki (JP); Kan Ikeda, Shizuoka (JP); Takeshi Suzuki, Shizuoka (JP); Daisuke Yamada, Ibaraki (JP); Mie Takahashi, Shizuoka (JP); Kenji Ishii, Ibaraki (JP)

(73) Assignee: Canon Kasei Kabushiki Kaisha, Ibaraki-Ken (JP)

( * ) Notice: Subject to any disclaimer, the term of this patent is extended or adjusted under 35 U.S.C. 154(b) by 0 days.

(21) Appl. No.: 09/985,740

(22) Filed: Nov. 6, 2001

(65) Prior Publication Data

US 2002/0086125 A1 Jul. 4, 2002

(30) Foreign Application Priority Data

Nov. 8, 2000 (JP) ....................................... 2000/340846

(51) Int. Cl.[7] ........................... G03G 15/00; B32B 1/08

(52) U.S. Cl. .................. 428/36.91; 428/34.1; 428/36.5; 428/36.8; 399/176; 399/313; 361/225; 492/53; 492/56

(58) Field of Search ............................. 428/34.1, 36.91, 428/36.5, 36.8; 399/176, 313; 361/225; 492/53, 56

(56) References Cited

U.S. PATENT DOCUMENTS

| | | | | |
|---|---|---|---|---|
| 4,387,980 A | | 6/1983 | Ueno et al. | 355/3 |
| 5,140,371 A | * | 8/1992 | Ishihara et al. | 361/225 |
| 6,343,199 B1 | * | 1/2002 | Kodama | 361/225 |
| 6,400,919 B1 | * | 6/2002 | Inoue et al. | 361/225 |

FOREIGN PATENT DOCUMENTS

| | | | |
|---|---|---|---|
| JP | 56-91253 | | 7/1981 |
| JP | 64-24264 | | 1/1989 |
| JP | 10-221930 | | 8/1998 |
| JP | 11065269 A | * | 3/1999 |

* cited by examiner

*Primary Examiner*—William P. Watkins, III

(57) ABSTRACT

A charging member includes a conductive mandrel, a semiconductive foamed elastic layer provided on the periphery of the mandrel, and a functional double-layer film provided on the periphery of the semiconductive foamed elastic layer. The semiconductive foamed elastic layer is a layer formed by making the mandrel and a semiconductive rubber composition standing uncured and unfoamed pass through a crosshead die of an extruder to set the composition on the periphery of the mandrel, followed by curing and foaming. The semiconductive rubber composition has a Mooney viscosity of from 15 to 30 and has a curing percentage of 40% or less when the foaming pressure reaches 50%. The functional double-layer film is a double-layer tube having a thin layer such that a tube formed out of only the layer is hard to use for covering. Also disclosed are a process cartridge and an electrophotographic apparatus which have such a charging member.

14 Claims, 3 Drawing Sheets

CHARGING MEMBER, PROCESS CARTRIDGE AND ELECTROPHOTOGRAPHIC APPARATUS

BACKGROUND OF THE INVENTION

1. Field of the Invention

This invention relates to a charging member which is disposed in contact with a charging object member and charges the charging object member electrostatically upon application of a voltage. This invention also relates to a process cartridge and an electrophotographic apparatus which have such a charging member.

2. Related Background Art

In recent years, a contact charging type charging means is being employed as a charging means used in image-forming apparatus such as an electrophotographic apparatus and an electrostatic recording apparatus. Contact charging is a method in which a charging object member is charged electrostatically to a stated polarity and potential by applying a voltage to a charging member disposed in contact with the charging object member, and has advantages such that the voltage of power sources can be set low, corona products, such as ozone, can be made to occur less frequently, and the system can be set up in simple construction to enable a cost reduction.

The voltage is applied to the charging member by a method in which only direct current is applied (a DC application method) or by another method in which an oscillating electric field (an electric field where the voltage value changes periodically with time) having a peak-to-peak voltage which is at least twice the voltage at which the charging of the charging object member is started is formed across the contact charging member and the charging object member to charge the surface of the charging object member (an AC application method). The latter can perform more uniform charging.

By the shape and form of the charging member to be brought into contact with the charging object member, units for the contact charging are roughly grouped into a roller type charging assembly making use of a roller member (charging roller) as its charging member (e.g., Japanese Patent Application Laid-Open No. 56-91253), a blade type charging assembly making use of a blade member (charging blade), and a brush type charging assembly making use of a brush member (charging brush) (e.g., Japanese Patent Application Laid-Open No. 64-24264).

The charging roller is rotatably supported with bearings and kept into pressure contact with the charging object member at a stated pressure, and is follow-up rotated with the movement of the charging object member. Also, the charging roller is usually a multi-layered structural member comprising a mandrel provided at its center as a substrate, a conductive elastic layer provided in the form of a roller on the periphery of the mandrel, and an intermediate layer and a surface layer which are further provided on the periphery of the elastic layer.

Of the above layers, the mandrel (metal layer) is a rigid body for maintaining the shape of the roller and at the same time has the function as a power supply electrode.

The elastic layer is required to have a volume resistivity of $1\times10^{2}$ to $1\times10^{10}$ Ω·cm and to be elastically deformable so as to ensure uniform contact with the charging object member. Accordingly, vulcanized (cured) rubbers are usually used therefor which are endowed with conductivity and have a flexibility of 70 degrees or below in rubber hardness (JIS A). Also, in conventional charging rollers, there have been a foam type and a solid type, the former making use of a rubber foam (or sponge rubber) as the elastic layer and the latter not making use of a rubber foam. The above AC application method has had a problem that a force acts between the charging roller and the charging object member because of the action of oscillating electric field and makes the charging object member vibrate to cause noise. Hence, it is considered preferable to use as the elastic layer a rubber foam as having a lower hardness.

The intermediate layer has the function to relax any compression of the elastic layer and the function to prevent the bleeding of any softening agents, such as oils and plasticizers, used in order to lower the hardness of the elastic layer; the latter function enhancing the freedom of materials used in the surface layer. The intermediate layer may usually have a surface resistivity of from $1\times10^{5}$ to $1\times10^{2}$ Ω/square, and has conventionally been formed by coating the elastic layer with a conductive coating material or covering it with a seamless tube.

The surface layer has the function to improve the uniformity in charging the charging object member and prevent any leak from being caused by pinholes of the charging object member surface, and also has the function to prevent toner particles, paper dust and so forth from sticking to the surface. The surface layer may usually have a surface resistivity of from $1\times10^{5}$ to $1\times10^{13}$ Ω/square, and, like the intermediate layer, has been formed by coating with a conductive coating material or covering with a seamless tube.

As a method of forming the elastic layer, a method is known in which an uncured (unvulcanized) and unfoamed semiconductive foamable rubber material is extruded in the form of a tube by means of an extruder, followed by heating in a curing furnace or the like to cure and foam the extruded product to form a semiconductive foamed rubber tube, and further a mandrel coated with a hot-melt adhesive is inserted to this semiconductive foamed rubber tube, followed by heating to bond the mandrel and the semiconductive foamed rubber tube together. This method, however, has had a problem that it requires so large a number of steps as to result in a high production cost.

As a countermeasure therefor, Japanese Patent Application Laid-Open No. 10-221930 discloses a method in which a mandrel coated with an adhesive is passed through a crosshead die of an extruder to dispose the uncured and unfoamed semiconductive foamable rubber material on the periphery of the mandrel, and thereafter the curing (vulcanization) and foaming of the rubber material and the bonding of the mandrel and the semiconductive foamed rubber tube together are simultaneously carried out using a vulcanizer or a continuous curing furnace so that the number of process steps can be cut down.

However, where in this method a semiconductive foamable rubber composition having a high foaming expansivity is used, the resultant semiconductive foamed rubber tends to lift partly from the mandrel as a result of the foaming of the semiconductive foamable rubber, and hence the composition can not be foamed at a high expansivity. Thus, this method has had problems such that any foamed rubber having a sufficiently low-hardness can not be obtained and the part where the rubber has lifted from the mandrel causes uneven charging.

As another method of producing a foamed robber having a low hardness, a method is also known in which a softening agent is added to the rubber composition in a large quantity. However, this method has had problems such that, when the softening agent is merely added in a large quantity, a slip may occur during kneading to make it impossible to carry on the kneading, and, when the softening agent is added little by little in a large quantity so as not to cause the slip, it takes long time to carry out the kneading, resulting in a cost increase.

As for a method of covering with the tube, a method is available in which an intermediate layer tube is inserted to a cylindrical mold and fastened to both ends of its inner wall, and the space between the tube and the mold inner wall is evacuated to bring the tube into close contact with the mold inner wall, in the state in which an elastic roller, obtained by forming an elastic layer on the periphery of a mandrel, is inserted under the application of a pressure. Covering with a surface layer tube may also be carried out in the same way.

However, where such a charging roller, having cover layers formed by superposing single-layer tubes prepared in plurality, by fitting them externally one by one to the elastic layer, is used for electrophotography, the charging roller is kept in pressure contact with the charging object member at a stated pressure under application of a load to both ends of the charging roller and is follow-up rotated with the movement of the charging object member. In such a case, a torsional force due to a difference in pressure contact force between the ends and the middle may act to cause the superposed tubes to slip off at their interface, so that the tubes become twisted. As the result, a difference in image density may appear at the part corresponding to the ends and the middle. This phenomenon tends to occur more as the elastic layer is softer and the pressure contact force at the both ends is greater.

As a method of preventing the tubes from being thus twisted, the inner diameter of each tube may be made larger with respect to the outer diameter of the elastic layer so that the tubes may tighten the elastic layer at a greater force. However, as an ill effect, the elastic layer may have so high an apparent hardness as to tend to make a large charging noise.

In addition, where the tubes are made of a thermoplastic resin or the elastic layer has a high hardness, any elongation of the tubes makes the charging roller have a large external diameter, so that its resistance value may become too high to charge the charging object member sufficiently. This phenomenon may more remarkably occur as the elastic layer is harder.

SUMMARY OF THE INVENTION

An object of the present invention is to provide a charging member which has an elastic layer having a sufficient elasticity and a sufficient adherence to the mandrel and also can exhibit very uniform charging performance without causing any twist of the cover layer on the elastic layer.

Another object of the present invention is to provide a process cartridge and an electrophotographic apparatus which have such a charging member.

To achieve the above objects, the present invention provides a charging member comprising a conductive mandrel, a semiconductive foamed elastic layer provided on the periphery of the mandrel, and a functional double-layer film provided on the periphery of the semiconductive foamed elastic layer, wherein;

the semiconductive foamed elastic layer is a layer formed by making the mandrel and a semiconductive rubber composition standing uncured and unfoamed pass through a crosshead die of an extruder to set the composition on the periphery of the mandrel, followed by curing and foaming;

the semiconductive rubber composition having a Mooney viscosity of from 15 to 30 and having a curing percentage of 40% or less when the foaming pressure reaches 50%; and the functional double-layer film being a double-layer tube having a thin layer such that a tube formed out of only the layer is hard to use for covering.

The present invention also provides a process cartridge and an electrophotographic apparatus which have the above charging member.

DESCRIPTION OF THE PREFERRED EMBODIMENTS

The charging member of the present invention is a charging member comprising a conductive mandrel, a semiconductive foamed elastic layer formed on the outer periphery of the mandrel, and a functional double-layer film formed on the semiconductive foamed elastic layer. The semiconductive foamed elastic layer is a layer formed by passing the mandrel and a semiconductive rubber composition standing uncured and unfoamed through a crosshead die of an extruder and curing and foaming the composition set on the outer periphery of the mandrel. The semiconductive rubber composition has a Mooney viscosity of from 15 to 30 and has a curing percentage of 40% or less when the foaming pressure reaches 50%, and the functional double-layer film is a double-layer tube having a thin layer such that a tube formed out of the layer alone is hard to use for covering.

In the charging roller having a low-hardness elastic layer covered with the functional double-layer film according to the present invention, the tube may hardly be twisted, and hence the force of tightening the elastic layer of the tube can be made small. As a result, the elastic layer may by no means have any high apparent hardness, and the merit of the elastic layer used in the present invention can very effectively be brought out. In addition, the tube may elongate with difficulty, and hence the charging roller may less increase in its outer diameter. Thus, according to the present invention, the construction for the elastic layer and cover layer on the elastic layer brings about a cooperative action to enable a very good charging uniformity to be achieved.

The present invention is described below in detail.

Figure 1:
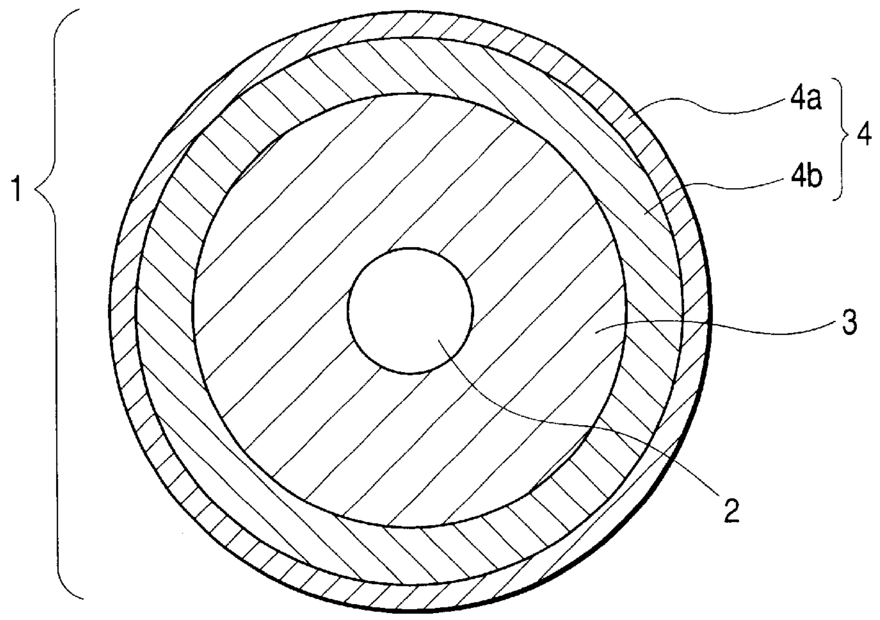
FIG. 1 illustrates a schematic cross-sectional view of an example of the charging member according to the present invention.

FIG. 1 shows an example of the charging member (hereinafter also "charging roller") of the present invention, denoted by 1, which is used in a charging assembly of an electrophotographic apparatus. This charging roller has a mandrel 2 made of a good-conductive material such as a metal, an alloy or a conductive plastic, and provided on its periphery a semiconductive foamed elastic layer 3 formed of an elastic material, and also has a tubular functional double-layer film 4 provided on the periphery of the semiconductive foamed elastic layer 3. In the case of the charging roller shown in FIG. 1, the functional double-layer film 4 consists of an inner layer 4*b* and an outer layer 4*a*.

As the mandrel (metal layer) 2 in the present invention, a good conductor may preferably be used, as exemplified by aluminum, stainless steel, coated iron, brass or an alloy containing any of these. The mandrel 2 used in the present invention may preferably have a diameter of from 3 to 10 mm. It may be a metal pipe having a wall thickness of from about 0.1 to 1.5 mm, or may be a rod.

The semiconductive foamed elastic layer 3 can be obtained by making the conductive mandrel 2 and an uncured and unfoamed semiconductive rubber composition pass through a crosshead die of an extruder to set the composition on the periphery of the mandrel 2, followed by curing and foaming.

In the present invention, such a semiconductive rubber composition has a viscosity of from 15 to 30 as Mooney viscosity at 100° C. ($ML_{1+4}$) according to JIS K-6300. If it has a Mooney viscosity lower than 15, the composition may, e.g., adhere to rolls at the time of kneading to make kneading workability very poor. If it has a Mooney viscosity larger than 30, it may make it difficult for the rubber composition to be foamed at a high expansivity, and moreover the mandrel 2 and the rubber composition may be brought into not so close contact at the time of extrusion, resulting in a poor adherence at the time of foaming or curing.

The viscosity of the semiconductive rubber composition may be influenced by the types and amounts of materials used, such as rubber components, conductive materials and also softening agents, and besides by conditions under which these are kneaded. In the present invention, however, there are no particular limitations on the means for achieving the viscosity, as long as the composition has the Mooney viscosity of from 15 to 30.

The semiconductive rubber composition used in the present invention also has the relationship between a foaming rate and a curing rate as measured at 140° C. such that the curing percentage, when the foaming pressure reaches 50% of its maximum value regarded as 100% (hereinafter "%Cure@TP50"), is 40% or less of the maximum value of the curing percentage. If it has a %Cure@TP50 more than 40%, a poor adherence between the mandrel 2 and the foamed rubber may result. The cause thereof is unclear, and is presumed as follows: When using a foamable rubber composition, the curing reaction of which proceeds to at least a certain degree (40% or more of the final extent of curing reaction) at the initial stage of a foaming-gas generation reaction (until the reaction is completed by 50% of the final extent of foaming-gas generation reaction), a foaming gas is generated in a large quantity after the curing of the roller surface has proceeded upon heating from the outside of the roller, and hence the foaming gas generated in excess tends to be stagnant between the mandrel 2 and the rubber without being released outward from the surface. The %Cure@TP50 may preferably be set to be 20% or less. Setting the %Cure@TP50 to be 20% or less can bring the mandrel 2 and the foamed rubber into sufficiently close contact even when a material having a high foaming expansivity is used.

Figure 2:
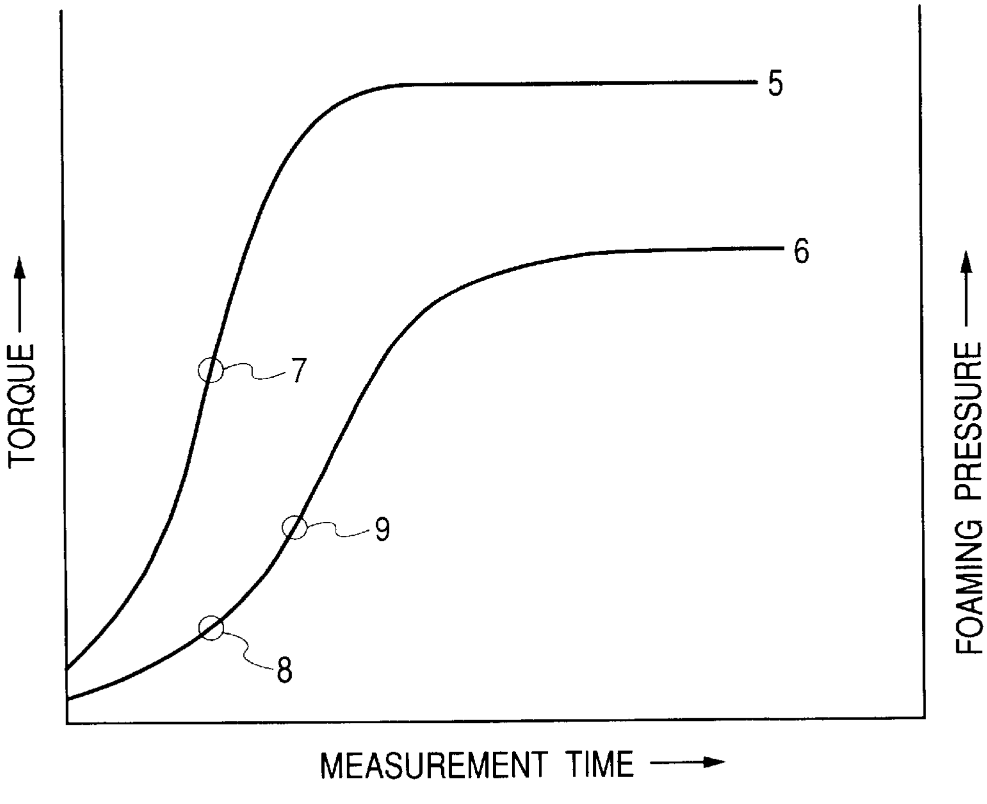
FIG. 2 is a graph showing an example of the curing curve and foaming pressure curve of a semiconductive rubber composition used in the present invention.

A graph showing the relationship between the foaming pressure and the curing percentage is shown in FIG. 2. In FIG. 2, reference numeral 5 denotes a foaming pressure curve; and 6 denotes a curing curve (the extent of progress of curing is expressed by torque applied to a test piece). Reference numeral 7 denotes the point where the foaming pressure reaches 50%. The curing percentage when the foaming pressure reaches 50%, i.e., the %Cure@TP50 is denoted by reference numeral 8. Reference numeral 9 denotes the point where the curing percentage is 40%.

In addition, the %Cure@TP50 may be regulated by appropriately selecting curing accelerators or foaming agents and foaming auxiliary agents.

There are no particular limitations on the rubber component of the semiconductive rubber material used in the present invention. Preferred are rubbers which are sulfur-curable by various curing methods. Stated specifically, ethylene-propylene diene copolymer rubbers (EPDM), isoprene rubbers (IR), butadiene rubbers (BR), styrene-butadiene copolymer rubbers (SBR), natural rubbers (NR), acrylonitrile-butadiene copolymer rubbers (NBR) are preferred. In particular, from the viewpoint of superior anti-ozone properties and easy control of curing rates, ethylene-propylene diene copolymer rubbers (EPDM) are more preferred.

There are also no particular limitations on the curing accelerator, and commonly available curing accelerators for rubbers may be used.

As the foaming agent, preferred are, e.g., azodicarbonamide (ADCA), p,p'-oxybis(benzenesulfonyl hydrazide) (OBSH), N,N'-dinitropentamethylenetetramine (DPT) and sodium hydrogencarbonate are preferred. In particular, from the viewpoint of an advantage that the curing rate may become fast with difficulty, azodicarbonamide (ADCA) is more preferred.

As the foaming auxiliary agent, any of commonly available foaming auxiliary agents may be used.

As a conductive material to be compounded into the above rubber composition, usable are carbon black, graphite, metals, and conductive metal oxides of various types such as tin oxide and titanium oxide; and conductive fibers of various types such as carbon fiber and short fibers of metal oxides. Such a conductive material may preferably be compounded in an amount of from 4 to 100 parts by weight, and particularly preferably from 5 to 50 parts by weight, based on 100 parts by weight of the total rubber components inclusive of the carbon black, which is one of the constituents in the present invention, and thereby the semiconductive foamed elastic layer 3 may preferably be regulated to have a volume resistivity of about $1\times10^4$ to $1\times10^9$ Ω·cm.

In the present invention, the semiconductive rubber composition may particularly preferably be a semiconductive rubber composition containing a conductive carbon black having a DBP oil absorption of 300 ml/100 g or more, in an amount of from 4 to 15 parts by weight based on 100 parts by weight of the rubber components, and also a softening agent in an amount at least twice as much as the amount of the conductive carbon black. The use of carbon black having the DBP oil absorption as high as 300 ml/100 g or more enables the carbon black to absorb the softening agent at the initial stage of kneading, and hence makes the slip occur with difficulty during kneading even when the softening agent is added in a large quantity. Also, if the carbon black is added in an amount smaller than 4 parts by weight based on 100 parts by weight of the rubber components, the effect on slip prevention may be obtained with difficulty if it is more than 15 parts by weight, a high hardness tends to result.

In the present invention, the DBP oil absorption of carbon black may preferably be 400 ml/100 g or more. The DBP oil absorption in the present invention is a DBP oil absorption per 100 g when DBP (dibutyl phthalate) is added to carbon black, and may be measured with an absorptometer.

The carbon black having a DBP oil absorption of 300 ml/100 g or more may include porous carbon black, and may include, e.g., Ketjen Black EC and Ketjen Black 600JD. As the softening agent, usable are commonly available softening agents for rubbers. In particular, paraffin oil is preferred.

In the present invention, in the semiconductive rubber composition, other usual compounding agents for rubbers may optionally appropriately be mixed, as exemplified by a conductivity-providing agent, a reinforcing agent, a filler, an anti-aging agent and a curing accelerator.

In the present invention, after curing and foaming the semiconductive rubber composition, the charging roller may preferably have an Asker C hardness of 33 degrees or less under a load of 500 g after the elastic layer has been ground down to a thickness of 3 mm. If the roller has a hardness higher than that, it tends to cause a large charging noise. As long as the roller has the hardness of 33 degrees, the elastic layer can readily be deformed when brought into contact with the charging object member (or the member to be charged), and hence, no contact gap is formed between the charging roller and the charging object member, so that a charging roller can be obtained in which noise-causative ripples are less and image unevenness due to non-uniform charging may hardly occur.

In the present invention, the elastic layer may appropriately be regulated in accordance with the type of the machine to which the charging member is mounted. It may preferably have a thickness of from 1 to 20 mm, and particularly preferably from 3 to 20 mm.

The functional double-layer film 4 used in the present invention is described below. The functional double-layer film 4 in the present invention is a polymer previously film-formed in the form of seamless tube, and covers the semiconductive foamed elastic layer 3 provided on the periphery of the mandrel 2.

As a material constituting the functional double-layer film 4, any material may be used as long as it is a rubber or thermoplastic resin capable of being extruded. Stated specifically, usable are, but not particularly limited to, ethylene-propylene diene rubbers (EPDM), ethylene-vinyl acetate, ethylene-ethyl acrylate, ethylene-methyl acrylate, styrene-butadiene rubbers, polyester, polyurethane, polyamides such as nylon 6, nylon 66, nylon 11, nylon 12 and other copolymer nylons, rubbers such as styrene-ethylene butyl, ethylene butyl, nitrilebutadiene rubbers, chlorosulfonated polyethylene, polysulfide rubbers, chlorinated polyethylene, chloroprene rubbers, butadiene rubbers, 1,2-polybutadiene, isoprene rubbers and polynorbornene rubbers, and thermoplastic rubbers such as styrene-butadiene-styrene (SBS) and styrene-butadiene-styrene hydrogenated products (SEBS).

Also preferred are combinations of elastomers such as elastomers comprised of any of the above resins and copolymers and modified products of these, with materials comprised of any of saturated polyesters such as polyethylene, polypropylene, polyethylene terephthalate (PET) and polybutylene terephthalate (PBT), polyether, polyamide, polycarbonate, polyacetal, acrylonitrile butadiene styrene, polystyrene, high-impact polystyrene (HIPS), polyurethane, polyphenylene oxide, polyvinyl acetate, polyvinylidene fluoride, polytetrafluoroethylene, styrene resins such as acrylonitrile-butadiene-styrene resin (ABS), acrylonitrile-ethylenepropylene rubber-styrene resin (AES) and acrylonitrile-acrylic rubber-styrene resin (AAS), resins such as acrylic resins, vinyl chloride resins and vinylidene chloride resins, and copolymers of these.

Still also usable are polymer alloys or polymer blends comprised of two or more polymers selected from the above rubbers, thermoplastic elastomers and thermoplastic resins.

The tube which is the functional double-layer film 4 according to the present invention can be obtained by film-forming a conductive polymer composition comprised of any of the above various polymers, a conductive material described below and optionally other additive(s), into a tube by any of forming methods such as extrusion, injection molding and blow molding. Of these forming methods, extrusion is particularly preferred. Also, in order to obtain tubes having a layer thickness uniformity for each thin-film layer of the tube formed and having a more uniform dispersibility of the conductive material and so forth, it is preferable to use a vertical-type tube extruder.

As the conductive material, any known materials may be used, which may include, e.g., fine carbon particles such as carbon black and graphite particles, fine metal particles such as nickel, silver, aluminum and copper particles; conductive fine metal oxide particles composed chiefly of tin oxide, zinc oxide, titanium oxide, aluminum oxide or silica and doped with impurity ions having different valency; conductive fibers such as carbon fiber; metal fibers such as stainless steel fiber; conductive whiskers such as carbon whiskers and conductive potassium titanate whiskers obtained by subjecting particle surfaces of potassium titanate whiskers to conductive treatment with a metal oxide or carbon; and conductive fine polymer particles such as polyaniline and polypyrrole particles.

The tube which is the functional double-layer film 4 used in the present invention can be used only by its mere formation by any of the above forming methods.

However, for the purpose of achieving, e.g., superior durability and environmental resistance, the seamless tube obtained by any of the above forming methods may further be cross-linked into a conductive cross-linked polymer. As methods of cross-linking any conductive polymers film-formed into tubes, it is effective to use a chemical cross-linking method in which a cross-linking agent such as sulfur, an organic peroxide or an amine selected according to the type of the polymer is previously added and crosslinkages are formed at a high temperature, and a radiation cross-linking method in which the polymer is irradiated by radiations such as electron rays and gamma rays to effect cross-linking. Of these cross-linking methods, the cross-linking method by electron rays is preferred because there is no possibility that the cross-linking agent or a decomposition product thereof migrates to contaminate the charging object member, and also in view of an advantage that any high-temperature treatment is unnecessary and in view of safety.

The functional double-layer film 4 used in the present invention may preferably have a resistance value of from $1\times10^5$ to $1\times10^{11}$ Ω, and particularly preferably from $1\times10^6$ to $1\times10^9$ Ω.

The functional double-layer film 4 in the present invention is also a double-layer in which appropriately functionally separated thin-layer tubes have been simultaneously formed. Accordingly, it is unnecessary to form each layer in an unnecessarily large thickness, and hence the flexibility of the semiconductive foamed elastic layer 3 can effectively be brought out. The functional double-layer film 4 may preferably be in a thickness of from 150 μm to 800 μm, and more preferably from 200 μm to 600 μm, as double-layer wall thickness.

Figure 3:
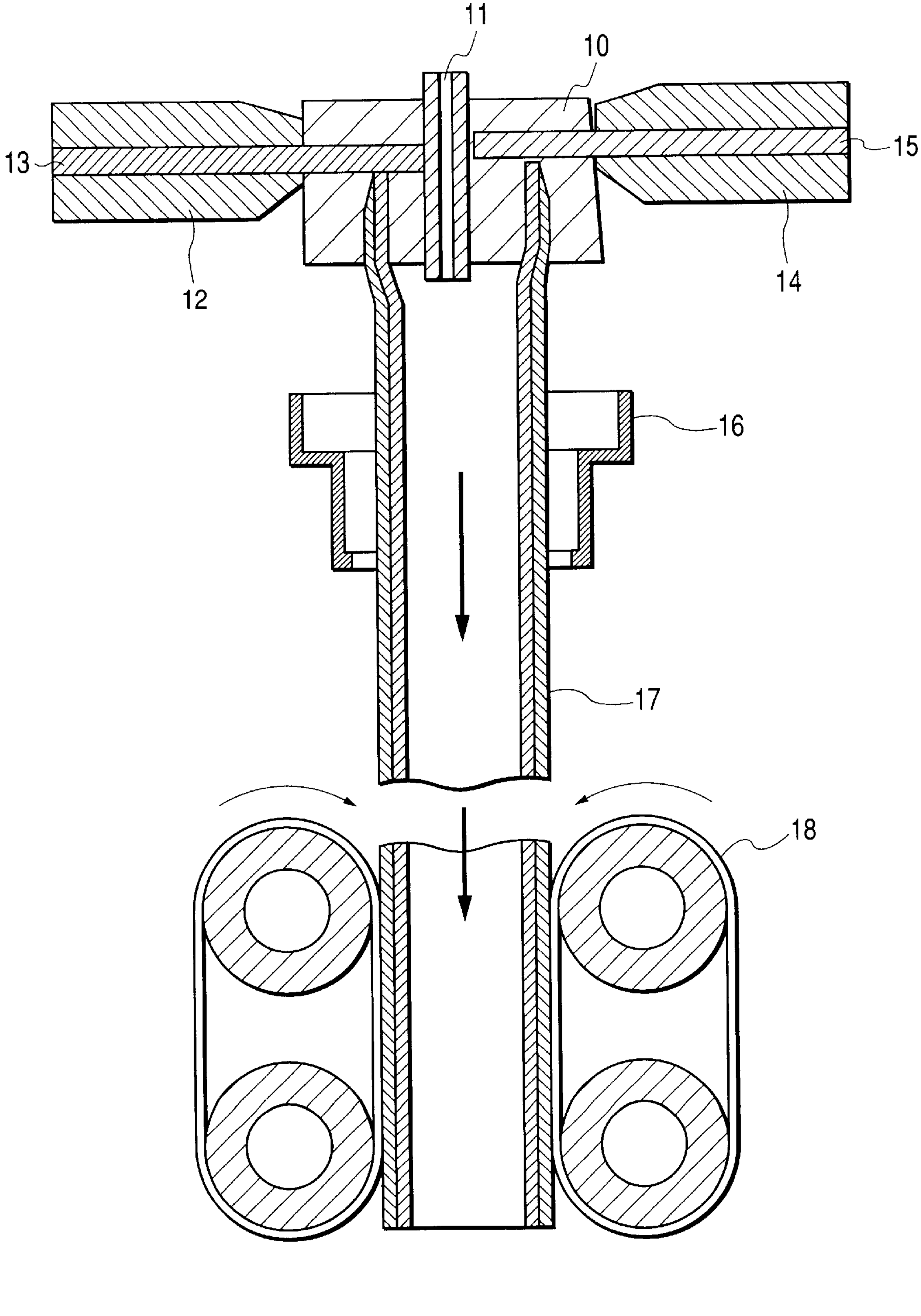
FIG. 3 illustrates a schematic cross-sectional view of an example of an extruder used in the present invention.

The extruder used in the present invention is described below with reference to FIG. 3. A die 10 is provided with an inner and outer double circular extrusion channel around an air-introducing center through-hole 11. At the time of extrusion, air is optionally blown through the center through-hole 11, during which an elastomer 13 for the inner layer 4*b*, which constitutes the functional double-layer film 4, and an elastomer 14 for the inner layer 4*a*, which also constitutes the functional double-layer film 4, are poured under pressure into the inside channel and the outside channel, respectively, and are extruded in such a way that the inner layer 4*b* and the outer layer 4*a* are superposed in an integral form to obtain a tube 17 which is the functional double-layer film 4. The tube thus obtained is cooled through a water-cooling ring 16 provided along the periphery of the tube, and this is stretched by means of a tube lead-on assembly 18. The tube is then successively cut in a stated length. The tube thus cut is used in the next step as the functional double-layer film 4 for the charging roller, to cover the semiconductive foamed elastic layer 3 provided on the mandrel 2.

Thus, in the present invention, even though each layer is so thin walled as to make it difficult for each layer alone to cover layer 3 as a tube, having a wall thickness of 100 μm or smaller as a single layer, the tube can be obtained in a thickness of 150 μm or larger, and preferably 200 μm or larger, as double-layer wall thickness, and hence can be handled as a single tube. For example, layers are so thin walled as to make it difficult for each layer alone to cover layer 3 as a tube, such that the wall thickness of the outer layer 4*a*/inner layer 4*b* is 75 μm/75 μm or 75 μm/125 μm. Such layers, each having such a thin wall, are formed in a double layer structure, whereby the layers can be handled as a single tube. Also, of course, a functional double-layer film having as one of the layers a layer which is so thin walled as to make it difficult for the layer alone to cover layer 3 as a tube, such that the wall thickness of the outer layer 4*a*/inner layer 4*b* is 100 μm/400 μm, 100 μm/200 μm, 50 μm/350 μm or 20 μm/350 μm, and can cover the elastic layer as a tube.

Incidentally, in order to form the thin-wall layer more thinly, it is effective to use a means for making the take-off greater at the time of extrusion to make the layer thickness much smaller at the extrusion end. Also, after the stretching, aging may properly be carried out so that any stress due to the stretching for making a thin wall can be relaxed.

In the present invention, a resin layer having a surface resistivity of $1\times10^7$ to $1\times10^9$ Ω/square may be disposed as the outer layer 4*a* in order to, e.g., endow it with breakdown strength, and a resin layer having a surface resistivity of $1\times10^8$ to $1\times10^{10}$ Ω/square may be disposed as the inner layer 4*b*. This can provide a functional double-layer film which is ideal for a roller the surface potential of which must be controlled, as in the charging roller.

Where it is necessary to provide the step of forming a plurality of tubes and superposing them in an integral form, any problem on the adherence between the inner and outer layers may occur with difficulty as long as materials for the both layers are resins of the same types, but an insufficient adherence between the layers tends to result when they are resins of different types. As the result, unless the tube is made to tighten the elastic layer at a strong force, the tube layers may slip off at their interface during service to cause faulty images. On the other hand, if tightened at a strong force, there may appear an ill effect that the elastic layer has so high an apparent hardness as to make charging noise worse.

In contrast thereto, in the present invention, even when resins of different types are used, they come into contact in the state of high temperature in the course of the simultaneous double-layer extrusion and are extruded outside in the form of a double layer and fixed in that state. Hence, a sufficient adherence required as the charging member can be attained, and therefore the tube can be made to tighten the elastic layer at a weak force.

As to the inner diameter of the tube which is the functional double-layer film 4 obtained according to the present invention, there are no particular limitations on it, and it may be determined depending on the outer diameter of the roller making use of this tube. It is common and preferable to use a small-diameter tube of from 10 to 20 mm in inner diameter.

In the case when the charging roller or developing roller is produced using the tube which is the functional double-layer film 4 obtained according to the present invention, the functional double-layer film 4 tube may be pulled on to the periphery of the roller having the mandrel 2 beforehand covered on its periphery with the semiconductive foamed elastic layer 3.

When this tube is pulled on, in order for the roller not to wrinkle, it is preferable for the functional double-layer film 4 tube to have an inner diameter which is a little smaller than the outer diameter of the semiconductive foamed elastic layer 3. For example, where the roller as a product has an outer diameter of 12.0 mm and the functional double-layer film 4 tube has a wall thickness of 0.4 mm in total for the inner and outer layers, the semiconductive foamed elastic layer 3 provided on the mandrel 2 may preferably be in an outer diameter of 11.3 mm and the functional double-layer film 4 tube in an inner diameter of about 11.1 mm.

When the functional double-layer film 4 tube is pulled on, its inner face or the outer periphery of the semiconductive foamed elastic layer 3 may optionally be treated with a primer, bonding them together. Without such treatment, they may also be joined by contact bonding.

There are no particular limitations on the electrophotographic photosensitive member, exposure means, developing means, transfer means and cleaning means used in the present invention.

Figure 4:
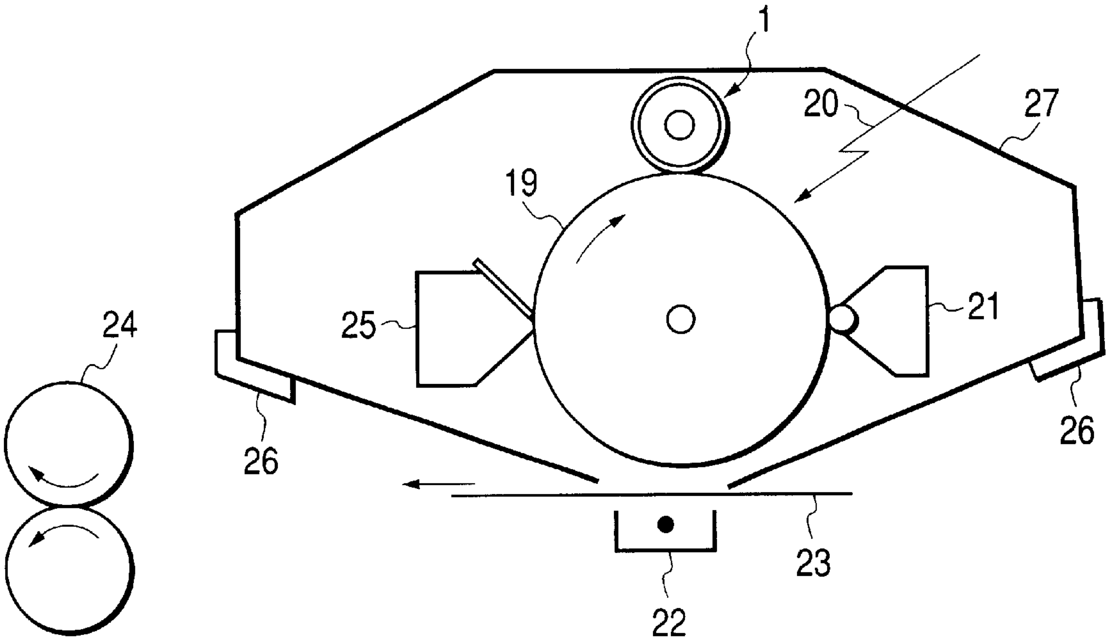
FIG. 4 schematically illustrates the construction of an electrophotographic apparatus having the process cartridge of the present invention.

FIG. 4 shows an example of the construction of an electrophotographic apparatus having a process cartridge having the charging member of the present invention as a primary charging means.

In FIG. 4, reference numeral 19 denotes an electrophotographic photosensitive member, which is rotatively driven in the direction of an arrow at a stated peripheral speed. The electrophotographic photosensitive member 19 is uniformly electrostatically charged on its periphery to a positive or negative, given potential through a charging member 1 of the present invention, and then exposed to exposure light 20 emitted from an exposure means (not shown) for slit exposure or laser beam scanning exposure. In such a way, electrostatic latent images are successively formed on the periphery of the electrophotographic photosensitive member 19.

The electrostatic latent images thus formed are subsequently developed with toner by the operation of a developing means 21. The resulting toner-developed images are then successively transferred by the operation of a transfer means 22, to a transfer medium 23 fed from a paper feed section (not shown) between the electrophotographic photosensitive member 19 and the transfer means 22 in such a manner as synchronized with the rotation of the electrophotographic photosensitive member 19.

The transfer medium 23 to which the images have been transferred is separated from the surface of the electrophotographic photosensitive member, is guided into a fixing means 24, where the images are fixed, and is then printed out of the apparatus as a copy. The surface of the electrophotographic photosensitive member 19 from which images have been transferred is subjected to removal of the toner remaining after the transfer, through a cleaning means 25. Thus the electrophotographic photosensitive member is cleaned on its surface, and then repeatedly used for image formation.

In the present invention, the apparatus may be constituted of a combination of a plurality of components integrally joined as a process cartridge from among the constituents such as the above electrophotographic photosensitive member 19, charging means 1 (charging member of the present invention), developing means 21 and cleaning means 25 so that the process cartridge is detachably mountable to the body of the electrophotographic apparatus such as a copying machine or a laser beam printer. For example, at least one of the charging means 1, the developing means 21 and the cleaning means 25 may integrally be supported in a cartridge together with the electrophotographic photosensitive member 19 to form a process cartridge that is detachably mountable to the main body of the apparatus through a guide means such as a rail 26 provided in the main body of the apparatus.

The present invention is described below in greater detail by giving Examples specifically.

EXAMPLE 1

Mandrel

As the mandrel 2, an iron material was drawn into a rod of about 6 mm in diameter by drawing, which was then cut in a length of 260 mm, followed by chemical plating in a thickness of about 3 μm. The surface of the mandrel 2 was further coated with a hot-melt adhesive.

Semiconductive Foamed Elastic Layer 3

100 parts by weight of a chief material EPDM (trade name: Esprene; available from Sumitomo Chemical Co., Ltd.), 12 parts by weight of conductive carbon black (trade name: KETJEN BLACK 600, available from Lion Akzo Co., Ltd.), 75 parts by weight of paraffin oil (trade name: DIANA PROCESS OIL PW-380, available from Idemitsu Kosan Co., Ltd.), 5 parts by weight each of two types of zinc oxides, 1 part by weight of stearic acid, 5 parts by weight of calcium oxide (trade name: BESTA BS, available from Inoue Sekkai Kogyo K. K.) as a dehydrating agent, 2 parts by weight of 2-mercaptobenzothiazole (MBT), 1 part by weight of zinc dibutyldithiocarbamate (ZDBC), 2 parts by weight of dipentamethylene thiuramtetrasulfide (DPTT) and 2 parts by weight of tellurium diethyldithiocarbamate (TDEC) as curing accelerators, 2 parts by weight of sulfur as a curing agent, 6.5 parts by weight of p,p'-oxybis (benzenesulfonyl hydrazide) (OBSH) and 5.5 parts by weight of azodicarbonamide (ADCA) as a foaming agent were kneaded to obtain a semiconductive foamable rubber composition for the semiconductive foamed elastic layer 3.

In respect of the composition thus obtained, Mooney viscosity ($ML_{1+4}$) was measured at 100° C. according to JIS K-6300 to find that it was 21. Its %Cure@TP50 was also measured at 140° C. by means of a curing tester with foaming pressure measuring instrument MDR-200P (manufactured by Alpha Technologies Co.) to find that it was 35%. Next, this semiconductive foamable rubber composition and the above mandrel 2 coated with the adhesive were simultaneously passed through a crosshead die extruder to form (dispose) an uncured and unfoamed semiconductive rubber layer on the periphery of the mandrel 2.

Next, this was put into a 200° C. continuous hot-air oven to effect curing and foaming. The elastic layer formed was cut away at its ends to have a length of 225 mm in the axial direction. Then the elastic layer was ground down by means of a grinder for rubber rollers (a traverse grinder manufactured by Mizukuchi Seisakusho) to have a thickness of 3 mm, and its hardness was measured. Thus, a semiconductive foamed elastic layer 3 of 11.3 mm in external diameter was obtained. Its Asker C hardness under a load of 500 g was 28 degrees.

Functional Double-Layer Film 4 Tube

As materials for the outer layer **4*a* of the functional double-layer film 4**, 100 parts by weight of a styrene type elastomer, styrene-ethylene butylene-olefin copolymer elastomer (trade name: DYNALON; available from JSR Corporation), 50 parts by weight of low-density polyethylene and 14 parts by weight of carbon black (trade name; KETJEN BLACK EC, available from Lion Akzo Co., Ltd.) were mixed for several minutes by means of a V-type blender. The mixture obtained was further melt-kneaded at 190° C. for 10 minutes by means of a pressure kneader, and the kneaded product obtained was cooled and thereafter pulverized using a pulverizer. The resultant pulverized product was pelletized by means of a single-screw extruder.

As materials for the inner layer **4*b*, 100 parts by weight of polyurethane elastomer (trade name: KURAMILON; available from Kuraray Co., Ltd.), 17 parts by weight of carbon black (trade name; KETJEN BLACK EC, available from Lion Akzo Co., Ltd.), 10 parts by weight of magnesium oxide and 1 parts by weight of calcium stearate were pelletized through the same steps as the materials for the outer layer 4*a***.

Using a vertical-type extruder (a custom-built machine made by Puragiken K. K., see FIG. 3), the pellets for these layers were joined at its one crosshead so as to form a double layer, which was then extruded into hot water with appropriate temperature (40 to 90° C.), and, after cooling, the extruded product was taken off. Thus, a functional double-layer film 4 tube of about 11.1 mm in inner diameter was obtained.

The tube was sampled at its part not used to cover the semiconductive foamed elastic layer 3. The sample obtained was cut open, and the surface resistivity of its inner layer **4*b* (back side) and outer layer 4*a* (surface side) was measured with a high-resistivity meter (HI-RESTER IP, manufactured by Dia Instruments Co.) to find that the surface resistivity of the inner layer 4*b* was $2.0\times10^8$ Ω/square and the surface resistivity of the outer layer 4*a* was $5.0\times10^8$ Ω/square. Also, its cross section was observed on a video microscope, and the thickness of the inner layer 4*b* and outer layer 4*a* was observed to find that the thickness of the inner layer 4*b* was 400 μm and the thickness of the outer layer 4*a*** was 100 μm.

Next, the functional double-layer film 4 tube was cut in a length of 230 mm, which was then pulled on to the periphery of the semiconductive foamed elastic layer 3 by means of a tube covering unit (not shown), and was brought into pressure close contact with the latter to obtain a charging roller. The charging roller obtained was in an outer diameter of 12.15 mm.

This charging roller was used in a primary charging assembly (the charging roller is kept in pressure contact with the charging object member under application of a load to the former's both ends at a spring pressure of 500 g for each end) of a laser beam printer (trade name: LBP-1660; manufactured by CANON INC.) to form images. As the result, good images free of any uneven images and any linear or spot-like abnormal areas were obtained without causing any slip-off between the functional double-layer film 4 and the semiconductive foamed elastic layer 3 and also without any wrinkling of the functional double-layer film 4.

To make evaluation further on any noise during image formation, A-weighted sound pressure level was measured with a noise meter (trade name: NL-05, manufactured by RION K. K.) at a distance of 20 cm from the center line in the generatrix direction of the electrophotographic photosensitive member. As the result, the amount of change in charging noise in the period of one rotation of the charging roller was within 1 dB.

This charging roller was also left for 3 months and thereafter its outer diameter was measured, where the outer diameter was 12.15 mm, showing no change, and good images were obtained.

COMPARATIVE EXAMPLE 1

The same semiconductive foamed elastic layer 3 as that in Example 1, having an external diameter of 11.3 mm and an Asker C hardness of 28 degrees, was formed on the mandrel 2.

As materials for the outer layer 4*a*, 100 parts by weight of a styrene type elastomer, styrene-ethylene butylene-olefin copolymer elastomer (trade name: DYNALON; available from JSR Corporation), 50 parts by weight of low-density polyethylene and 14 parts by weight of carbon black (trade name; KETJEN BLACK EC, available from Lion Akzo Co., Ltd.) were mixed for several minutes by means of a V-type blender. The mixture obtained was further melt-kneaded at 190° C. for 10 minutes by means of a pressure kneader, and the kneaded product obtained was cooled and thereafter pulverized using a pulverizer. The resultant pulverized product was pelletized by means of a single-screw extruder.

Using a vertical-type extruder (a custom-built machine made by Puragiken K. K.), the pellets thus obtained were passed through its crosshead for a single layer, and only the outer layer was extruded into hot water with appropriate temperature (40 to 90° C.), and, after cooling, the extruded product was taken off. Thus, a surface-layer tube (single-layer tube for outer layer) was obtained, having an inner diameter of 11.8 mm, a wall thickness of 200 $\mu$m and a surface resistivity of $8.0\times10^7$ Ω/square.

As materials for the inner layer 4*b*, 100 parts by weight of polyurethane elastomer (trade name: KURAMILON; available from Kuraray Co., Ltd.), 17 parts by weight of carbon black (trade name; KETJEN BLACK EC, available from Lion Akzo Co., Ltd.), 10 parts by weight of magnesium oxide and 1 parts by weight of calcium stearate were pelletized through the same steps as the materials for the outer layer 4*a*.

Using the vertical-type extruder (a custom-built machine made by Puragiken K. K.), the pellets thus obtained were passed through its crosshead for a single layer, and only the inner layer was extruded into hot water with appropriate temperature (40 to 90° C.), and, after cooling, the extruded product was taken off. Thus, an intermediate-layer tube (single-layer tube for inner layer) was obtained, having an inner diameter of 11.1 mm, a wall thickness of 400 $\mu$m and a surface resistivity of $3.0\times10^8$ Ω/square.

Next, the intermediate-layer tube was cut in a length of 230 mm, which was then pulled on to the periphery of the semiconductive foamed elastic layer 3 by means of a tube covering unit (not shown), and was brought into pressure close contact with the latter to provide a roller of 11.95 mm in outer diameter. Also, the surface-layer tube was cut in a length of 230 mm, which was then superposingly pulled on to the intermediate-layer tube by means of the tube covering unit (not shown) to obtain a charging roller. The charging roller obtained was in an outer diameter of 12.35 mm.

Images were continuously formed on 100 sheets in the same manner as in Example 1. As the result, image density fog was seen at both end areas. The charging roller was taken out to make observation, where, between the surface layer and the intermediate layer, the surface layer was found to have slipped off at its both ends by about 3 mm with respect to the middle portion and stood twisted. However, when this charging roller was left for 3 months and thereafter its outer diameter was measured, the outer diameter was 12.35 mm, showing no change.

COMPARATIVE EXAMPLE 2

The same semiconductive foamed elastic layer 3 in Comparative Example 1, having an external diameter of 11.3 mm and an Asker C hardness of 28 degrees, was formed on the mandrel 2.

The subsequent procedure of Comparative Example 1 was also repeated to obtain a surface-layer tube (single-layer tube for outer layer) having an inner diameter of 11.3 mm, a wall thickness of 200 $\mu$m and a surface resistivity of $8.0\times10^7$ Ω/square and an intermediate-layer tube (single-layer tube for inner layer) having an inner diameter of 11.1 mm, a wall thickness of 400 $\mu$m and a surface resistivity of $3.0\times10^8$ Ω/square.

Next, the intermediate-layer tube was cut in a length of 230 mm, which was then pulled on to the periphery of the semiconductive foamed elastic layer 3 by means of a tube covering unit (not shown), and was brought into pressure close contact with the latter to provide a roller of 11.95 mm in outer diameter. Also, the surface-layer tube was cut in a length of 230 mm, which was then superposingly pulled on to the intermediate-layer tube by means of the tube covering unit (not shown) to obtain a charging roller. The charging roller obtained was in an outer diameter of 12.20 mm.

This charging roller was evaluated in the same manner as in Example 1. As the result, good images free of any uneven images and any linear or spot-like abnormal areas were obtained without causing any slip-off between the surface layer and the intermediate layer.

However, when this charging roller was left for 3 months and thereafter its outer diameter was measured, the outer diameter was 12.30 mm, having become large by 0.1 mm, and the surface resistivity of the surface layer came to a high resistivity of $7.0\times10^{12}$ Ω/square to cause fog over the whole images because of an insufficient charging to the charging object member.

EXAMPLE 2

The same semiconductive foamed elastic layer 3 as that in Example 1, having an external diameter of 11.3 mm and an Asker C hardness of 28 degrees, was formed on the mandrel 2.

The subsequent procedure of Example 1 was also repeated to obtain a functional double-layer film 4 tube of about 11.1 mm in inner diameter. Its inner layer 4*b* had a surface resistivity of $5.0\times10^8$ Ω/square and was in a thickness of 200 $\mu$m, and its outer layer 4*a* had a surface resistivity of $1.0\times10^{10}$ Ω/square and was in a thickness of 25 $\mu$m.

Next, the functional double-layer film 4 tube was cut in a length of 230 mm, which was then pulled on to the periphery of the semiconductive foamed elastic layer 3 by means of a tube covering unit (not shown), and was brought into pressure close contact with the latter to obtain a charging roller having an outer diameter of 11.60 mm.

This charging roller was evaluated in the same manner as in Example 1. As the result, good images free of any uneven images and any linear or spot-like abnormal areas were obtained without causing any slip-off between the functional double-layer film 4 and the semiconductive foamed elastic layer 3 and also without any wrinkling of the functional double-layer film 4. Also when this charging roller was left for 3 months, its outer diameter was 11.60 mm, showing no change, and good images were obtained.

This charging roller was further evaluated by forming images in the state that pinholes of 0.5 mm diameter were pricked with a needle in the charging were formed in the object member (electrophotographic photosensitive member). As the result, in halftone images any faulty images other than 0.5 mm black-spot images were not seen.

The like evaluation was made in respect of the charging rollers of Example 1 and Comparative Example 2. As the result, in halftone images, any faulty images other than 0.5 mm black-spot images were not seen in respect of the charging roller of Example 1. In respect of the charging roller of Comparative Example 2, however, black spots were seen to have extended to about 0.6 mm, and horizontal black lines were also seen in the generatrix direction.

COMPARATIVE EXAMPLE 3

A semiconductive foamable rubber composition for the semiconductive foamed elastic layer 3 was obtained in the same manner as in Example 1 except that, in the formulation for the elastic layer in Example 1, DIANA PROCESS OIL PW-380 was used in an amount changed to 45 parts by weight.

The Mooney viscosity ($ML_{1+4}$) at 100° C. of the composition thus obtained was 35, and the %Cure@TP50 was 36%.

A semiconductive foamed elastic layer 3 having an external diameter of 11.3 mm and an Asker C hardness of 39 degrees was formed on the mandrel 2 in the same manner as in Example 1 except for using this manner as in Example 1 except for using this semiconductive foamable rubber composition.

The subsequent procedure of Example 1 was also repeated to obtain a functional double-layer film 4 tube of about 11.1 mm in inner diameter. Its inner layer 4*b* had a surface resistivity of $2.0\times10^8$ Ω/square and was in a thickness of 400 μm, and its outer layer 4*a* had a surface resistivity of $5.0\times10^8$ Ω/square and was in a thickness of 100 μm.

Next, the functional double-layer film 4 tube was cut in a length of 230 mm, which was then pulled on to the periphery of the semiconductive foamed elastic layer 3 by means of a tube covering unit (not shown), and was brought into pressure close contact with the latter to obtain a charging roller having an outer diameter of 12.20 mm.

This charging roller was evaluated in the same manner as in Example 1. As the result, fog was seen at the image middle area in halftone images formed on 3,000 and following sheets. Also, the state of contact between the charging object member and the charging roller was examined to find a space (contact gap) of about 30 μm at the middle portion.

Evaluation was also made on noise in the same manner as in Example 1. As the result, the amount of change in charging noise in the period of one rotation of the charging roller was 4 dB.

A charging roller was produced in the same manner as in Example 1 except that as the foaming agent of the semiconductive rubber composition 5.5 parts by weight of azodicarbonamide (ADCA) was used and 1.5 parts by weight of a urea type foaming auxiliary agent was also used. Evaluation was made in the same way. As the result, the same good results as in Example 1 were obtained.

Here, the Mooney viscosity ($ML_{1+4}$) at 100° C. of the semiconductive rubber composition obtained was 20, and the %Cure@TP50 at 140° C. was 16%. Also, the Asker C hardness of the semiconductive foamed elastic layer was 20 degrees.

COMPARATIVE EXAMPLE 4

It was attempted to produce a charging roller in the same manner as in Example 1 except that as the foaming agent of the semiconductive rubber composition 5.5 parts by weight of azodicarbonamide (ADCA) was used. However, when put into the 200° C. continuous hot-air oven, the foamed rubber lifted from the mandrel, so that it was unable to bond the elastic layer at all to the mandrel, resulting in failure to produce the desired charging roller.

Here, the Mooney viscosity ($ML_{1+4}$) at 100° C. of the semiconductive rubber composition obtained was 20, but the %Cure@TP50 at 140° C. was 88%.

COMPARATIVE EXAMPLE 5

It was attempted to produce a charging roller in the same manner as in Example 1 except that as the foaming agent of the semiconductive rubber composition the p,p'-oxybis (benzenesulfonyl hydrazide) was added in an amount of 6.5 parts by weight. However, when put into the 200° C. continuous hot-air oven, the foamed rubber lifted from the mandrel, so that it was unable to bond the elastic layer sufficiently to the mandrel, resulting in failure to produce the desired charging roller.

Here, the Mooney viscosity ($ML_{1+4}$) at 100° C. of the semiconductive rubber composition obtained was 20, but the %Cure@TP50 at 140° C. was 43%.

What is claimed is:

1. A charging member comprising a conductive mandrel, a semiconductive foamed elastic layer provided on the periphery of said mandrel, and a functional double-layer film provided on the periphery of said semiconductive foamed elastic layer, said semiconductive foamed elastic layer being a layer formed by making said mandrel and a semiconductive rubber composition standing uncured and unfoamed pass through a crosshead die of an extruder to set the semiconductive rubber composition on the periphery of said mandrel, followed by curing and foaming, said semiconductive rubber composition having a Mooney viscosity of from 15 to 30 and having a curing percentage of 40% or less when the foaming pressure reaches 50%, and said functional double-layer film being a double-layer tube having a thin layer that is sufficiently thin such that a tube formed out of only said thin layer is hard to use for covering said semiconductive foamed elastic layer.

2. A charging member according to claim 1, wherein said semiconductive rubber composition contains:

conductive carbon black having a dibutyl phthalate oil absorption of 300 ml/100 g or more, in an amount of from 4 parts by weight to 15 parts by weight based on 100 parts by weight of a rubber component; and a softening agent present in at least twice the amount of the conductive carbon black.

3. A charging member according to claim 1, wherein said semiconductive rubber composition contains an ethylene-propylene diene copolymer rubber as a rubber component.

4. A charging member according to claim 1, wherein said functional double-layer film has a double-layer wall thickness of from 150 μm to 800 μm.

5. A charging member according to claim 1, wherein said functional double-layer film has a double-layer wall thickness of from 200 μm to 600 μm.

6. A charging member according to claim 1, wherein said thin layer has a thickness of 100 μm or smaller.

7. A process cartridge comprising an electrophotographic photosensitive member and a charging member disposed in contact with said electrophotographic photosensitive member, said electrophotographic photosensitive member and said charging member being supported as one unit and being detachably mountable on a main body of an electrophotographic apparatus, said charging member comprising a conductive mandrel, a semiconductive foamed elastic layer provided on the periphery of said mandrel, and a functional double-layer film provided on the periphery of said semiconductive foamed elastic layer, said semiconductive foamed elastic layer being a layer formed by making said mandrel and a semiconductive rubber composition standing uncured and unfoamed pass through a crosshead die of an extruder to set the semiconductive rubber composition on the periphery of said mandrel, followed by curing and foaming, said semiconductive rubber composition having a Mooney viscosity of from 15 to 30 and having a curing percentage of 40% or less when the foaming pressure reaches 50%, and said functional double-layer film being a double-layer tube having a thin layer that is sufficiently thin such that a tube formed out of only said thin layer is hard to use for covering said semiconductive foamed elastic layer.

8. An electrophotographic apparatus comprising an electrophotographic photosensitive member, a charging member disposed in contact with the electrophotographic photosensitive member, a developing means for developing a latent image on said photosensitive member, and a transfer means, for transferring the developed latent image to a recording medium, said charging member comprising a conductive mandrel, a semiconductive foamed elastic layer provided on the periphery of said mandrel, and a functional double-layer film provided on the periphery of said semiconductive foamed elastic layer, said semiconductive foamed elastic layer being a layer formed by making said mandrel and a semiconductive rubber composition standing uncured and unfoamed pass through a crosshead die of an extruder to set the semiconductive rubber composition on the periphery of said mandrel, followed by curing and foaming, said semiconductive rubber composition having a Mooney viscosity of from 15 to 30 and having a curing percentage of 40% or less when the foaming pressure reaches 50%, and said functional double-layer film being a double-layer tube having a thin layer that is sufficiently thin such that a tube formed out of only said thin layer is hard to use for covering said semiconductive foamed elastic layer.

9. A process cartridge according to claim 7, wherein said thin layer has a wall thickness of substantially no more than 100 μm.

10. A process cartridge according to claim 9, wherein said functional double-layer film has a double-layer wall thickness of from substantially 150 μm to 800 μm.

11. A process cartridge according to claim 9, wherein said functional double-layer film has a double-layer wall thickness of from substantially 200 μm to 600 μm.

12. An apparatus according to claim 8, wherein said thin layer has a wall thickness of substantially no more than 100 μm.

13. An apparatus according to claim 12, wherein said functional double-layer film has a double-layer wall thickness of from substantially 150 μm to 800 μm.

14. An apparatus according to claim 12, wherein said functional double-layer film has a double-layer wall thickness of from substantially 200 μm to 600 μm.

* * * * *

UNITED STATES PATENT AND TRADEMARK OFFICE

CERTIFICATE OF CORRECTION

PATENT NO. : 6,703,094 B2
DATED : March 9, 2004
INVENTOR(S) : Hitoshi Kakii et al.

It is certified that error appears in the above-identified patent and that said Letters Patent is hereby corrected as shown below:

Title page,
Insert Item -- [74] *Attorney, Agent, or Firm*, - Fitzpatrick, Cella, Harper & Scinto --.
Item [56], References Cited, FOREIGN PATENT DOCUMENTS, "11065269 A" should read -- 11-065269 A --.

Column 2,
Line 11, "as having" should read -- which has --.
Line 18, "$1x10^2$" should read -- $1x10^{12}$ --.
Line 39, "to" should read -- into --.
Line 65, "robber" should read -- rubber --.

Column 3,
Line 7, "long" should read -- a long --.
Line 10, "to" should read -- into --.
Line 63, "wherein;" should read -- wherein: --.

Column 6,
Line 60, "difficulty if" should read -- difficulty. If --.

Column 9,
Line 55, "the" should be deleted.

Column 13,
Line 53, "parts" should read -- part --.

Signed and Sealed this

Thirteenth Day of July, 2004

JON W. DUDAS
*Acting Director of the United States Patent and Trademark Office*